United States Patent
Kokubo

(10) Patent No.: US 12,162,713 B2
(45) Date of Patent: Dec. 10, 2024

(54) SHEET REVERSING APPARATUS AND IMAGE FORMING APPARATUS

(71) Applicant: CANON KABUSHIKI KAISHA, Tokyo (JP)

(72) Inventor: Hiroshi Kokubo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 17/683,659

(22) Filed: Mar. 1, 2022

(65) Prior Publication Data

US 2022/0306414 A1    Sep. 29, 2022

(30) Foreign Application Priority Data

Mar. 29, 2021    (JP) ................. 2021-055088

(51) Int. Cl.
*B65H 85/00*    (2006.01)
*B41J 13/00*    (2006.01)
*B65H 5/06*    (2006.01)
*B65H 29/58*    (2006.01)

(52) U.S. Cl.
CPC .......... *B65H 5/062* (2013.01); *B41J 13/0045* (2013.01); *B65H 29/58* (2013.01)

(58) Field of Classification Search
CPC ........ B65H 5/062; B65H 29/58; B65H 85/00; B41J 13/0045

See application file for complete search history.

(56) References Cited

U.S. PATENT DOCUMENTS

| | | | | |
|---|---|---|---|---|
| 5,604,577 | A | * 2/1997 | Wakuda | ............... G03G 15/234 271/3.03 |
| 8,417,176 | B2 | 4/2013 | Shoji | |
| 2018/0117929 | A1 | * 5/2018 | Nakamura | ......... G03G 21/1638 |
| 2020/0239252 | A1 | * 7/2020 | Komuro | ................ B65H 5/026 |
| 2021/0072693 | A1 | * 3/2021 | Ikeda | .................. G03G 15/6511 |
| 2022/0162029 | A1 | * 5/2022 | Sugai | .................... B65H 29/125 |

FOREIGN PATENT DOCUMENTS

JP    2009069796 A    4/2009

* cited by examiner

*Primary Examiner* — Thomas A Morrison
(74) *Attorney, Agent, or Firm* — ROSSI, KIMMS & McDOWELL LLP

(57) ABSTRACT

A reversing roller pair is controlled such that, when an abnormality occurs during the conveying of a sheet, the sheet is conveyed in a forward direction by the reversing roller pair, and is controlled to continue conveying until a state where the final sheet among the sheets conveyed in the forward direction is detected by a first detection portion, and subsequently to stop in a state where the final sheet is nipped by the reversing roller pair.

10 Claims, 11 Drawing Sheets

SHEET REVERSING APPARATUS AND IMAGE FORMING APPARATUS

BACKGROUND OF THE INVENTION

Field of the Invention

The present invention relates to a sheet reversing apparatus and an image forming apparatus.

Description of the Related Art

An image forming apparatus such as a printer, a copying machine, or a multifunction machine is provided with a reverse conveying mechanism that includes a reversing roller pair that performs reverse conveyance in order to reverse a sheet, which is used as a recording material, for the purpose of duplex printing and so forth. When a sheet is to undergo duplex printing, the sheet, which has been conveyed in reverse by the reversing roller pair, is re-fed to an image forming portion via a reconveying path for duplex printing, in a state where the first side that has already undergone image formation and the second side that is to undergo image formation are reversed.

Japanese Patent Application Laid-Open No. 2009-69796 discloses an image forming apparatus that has a reverse conveying mechanism or a reconveying path like that described above. The image forming apparatus of Japanese Patent Application Laid-Open No. 2009-69796 is configured such that, when a sheet jam occurs during printing, a plurality of sheets, which remains in the apparatus, is collected and stored in a reversing space portion that is provided in the reverse conveying mechanism, and the stored sheets are detected by a detection portion. When sheets are detected by the detection portion, the fact that there are sheets that remain stagnant in the reversing space portion is displayed on a display portion.

However, in Japanese Patent Application Laid-Open No. 2009-69796, the detection portion may sometimes be unable to detect a sheet stored in the reversing space portion. For example, when a small-sized sheet is stored outside the detection area, or when a stored sheet lies outside the detection area due to curling or skew feeding, the sheet cannot be detected by the detection portion. In such cases, the detection portion may not be able to recognize a sheet that is stored in the reversing space portion, and thus may be unable to perform an operation to prompt the operator to remove the sheet. Furthermore, in a case where the operator forgets to remove a sheet stored in the reversing space portion and when the next printing operation is performed, the sheet that remains in the reversing space portion may come into contact with the sheet conveyed during the next print operation, thus resulting in damage to the sheet.

SUMMARY OF THE INVENTION

The present invention desirably provides a sheet reversing apparatus and an image forming apparatus that make it impossible to forget to remove a sheet that is stored in a reversing space portion.

A sheet reversing apparatus according to a first embodiment of the present invention has: a reversing roller pair that, after conveying a sheet in a forward direction while the sheet is in a nipped state, is configured to convey the sheet in reverse by conveying the sheet in an opposite direction opposite to the forward direction; a support portion that is configured to support the sheet which is conveyed in the forward direction by the reversing roller pair, in order to convey the sheet in the opposite direction; a first detection portion that is provided upstream in the forward direction of the reversing roller pair and that is configured to detect the sheet that is conveyed in reverse by the reversing roller pair; and a control portion that is configured to control the conveying of the sheet by the reversing roller pair based on a detection result from the first detection portion, wherein, when an abnormality occurs during the conveying of the sheet, the control portion is configured to convey the sheet in the forward direction using the reversing roller pair, and to control the reversing roller pair to continue conveying until a state where the final sheet among the sheets conveyed in the forward direction is detected by the first detection portion, and then to stop in a state where the final sheet is nipped.

Further features of the present invention will become apparent from the following description of exemplary embodiments (with reference to the attached drawings).

DESCRIPTION OF THE EMBODIMENTS

Figure 1:
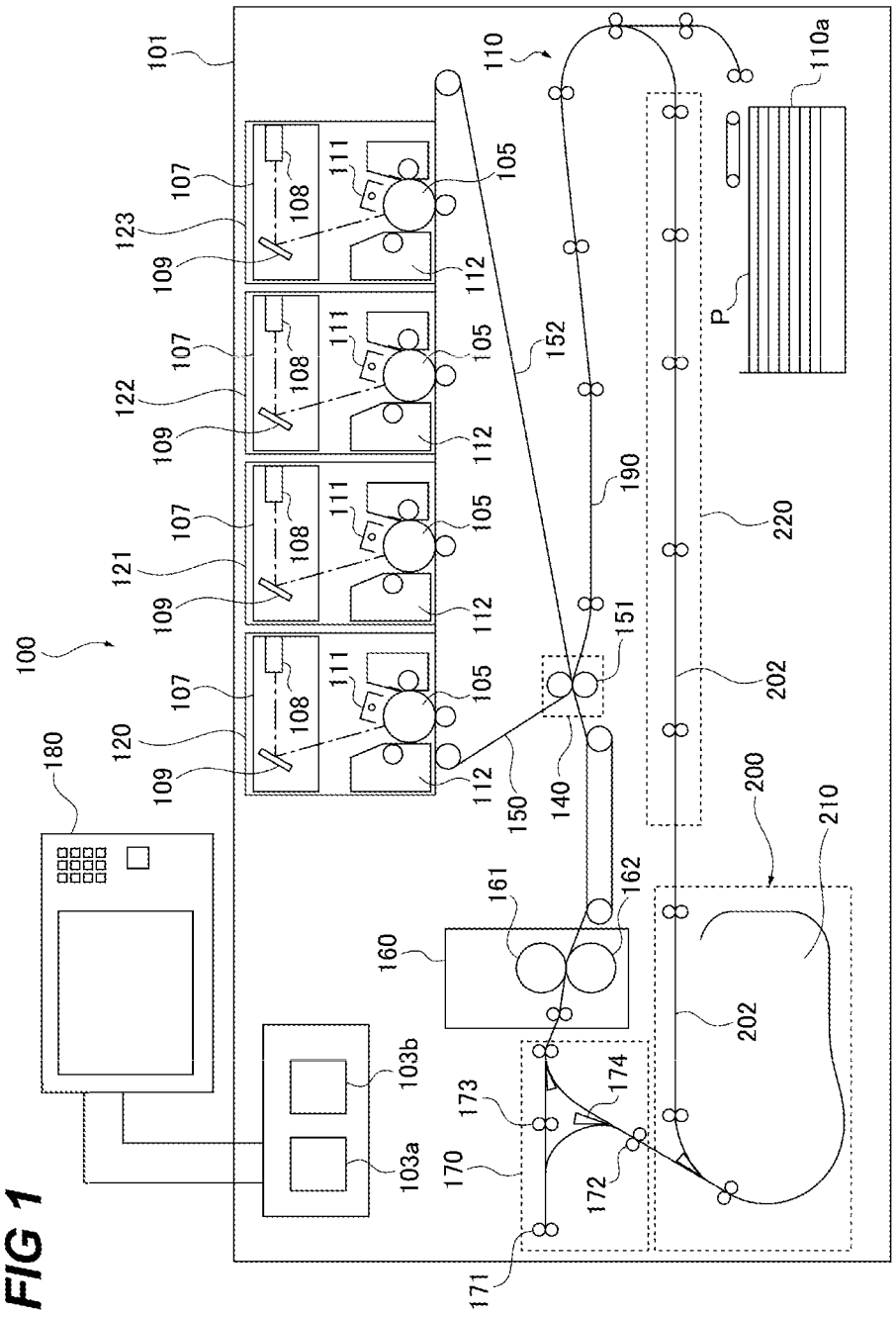
FIG. 1 is a schematic diagram of an image forming apparatus according to a first embodiment of the present invention.

Embodiments will be described in detail hereinbelow with reference to the drawings.

First Embodiment

<Configuration of Image Forming Apparatus>

The configuration of an image forming apparatus 100 according to a first embodiment of the present invention will be described in detail with reference to FIG. 1.

The image forming apparatus 100 has an enclosure 101, a control board storage portion 103, a feed conveying portion 110, an optical development processing portion 120, an optical development processing portion 121, an optical development processing portion 122, and an optical development processing portion 123. The image forming apparatus 100 also has a secondary transfer portion 140, an intermediate transfer portion 152, a fixing processing portion 160, a discharge portion 170, an operation portion 180, a sheet reversing apparatus 200, and a duplex conveying mechanism 220.

The optical development processing portion 120, optical development processing portion 121, optical development processing portion 122, optical development processing portion 123, secondary transfer portion 140, intermediate transfer portion 152, fixing processing portion 160, discharge portion 170, sheet reversing apparatus 200, and duplex conveying mechanism 220 constitute an engine portion. The optical development processing portion 120, optical development processing portion 121, optical development processing portion 122, optical development processing portion 123, secondary transfer portion 140, intermediate transfer portion 152, and fixing processing portion 160 also constitute an image forming portion. The image forming apparatus 100 illustrated in FIG. 1 serves as an example of a laser beam printer here.

The enclosure 101 houses the control board storage portion 103 and the engine portion.

The control board storage portion 103 stores an engine controller 103*a*, and a printer controller 103*b*.

The engine controller 103*a*, which serves as a control portion, performs serial communication with the printer controller 103*b* and controls the operation of the engine portion based on instruction information that is input from the printer controller 103*b*.

The printer controller 103*b* expands the image data received from an external computer as bit data which is required for image formation, and executes a print job by centrally controlling the engine controller 103*a* by outputting the instruction information to the engine controller 103*a*. By executing the print job, the printer controller 103*b* outputs image data to a laser scanner portion 107 in each of the optical development processing portion 120, optical development processing portion 121, optical development processing portion 122, and optical development processing portion 123.

The feed conveying portion 110 is equipped with a storage compartment 110*a* and a main conveying path 190, and conveys the sheet P stored in the storage compartment 110*a* or the sheet P conveyed from a duplex conveying path 202 toward the secondary transfer portion 140.

The storage compartment 110*a* stores the sheet P.

The main conveying path 190 extends substantially horizontally in FIG. 1. The main conveying path 190 is a conveying path from the feed conveying portion 110 to the discharge portion 170 via the secondary transfer portion 140 and the fixing processing portion 160.

The optical development processing portion 120, optical development processing portion 121, optical development processing portion 122, and optical development processing portion 123 are each stations that perform the respective charging, exposure, and development processing in the electrophotographic process to create a monochromatic visible image (toner image) on an intermediate transfer member 150. The optical development processing portion 120, optical development processing portion 121, optical development processing portion 122, and optical development processing portion 123 are each equipped with a photosensitive drum 105, a laser scanner portion 107, a semiconductor laser 108, and a reflex polygon mirror 109. Further, the optical development processing portion 120, optical development processing portion 121, optical development processing portion 122, and optical development processing portion 123 are each equipped with a primary charger 111, and a development device 112.

The photosensitive drums 105 are attached using an attachment member to the enclosure 101 and is rotationally driven.

The laser scanner portion 107 is equipped with a laser driver that controls the emission of the laser beam from the semiconductor laser 108 according to image data which is input from the printer controller 103*b*.

The semiconductor laser 108 emits a laser beam to the reflex polygon mirror 109 under the control of the laser driver of the laser scanner portion 107.

The reflex polygon mirror 109 irradiates the photosensitive drum 105 with the laser beam emitted by the semiconductor laser 108, thereby forming an electrostatic latent image on the photosensitive drum 105 by using the laser beam to scan and expose the photosensitive drum 105 in the main scanning direction.

The primary charger 111 uniformly charges the photosensitive drum 105.

The development device 112 forms a visible image by supplying toner to the electrostatic latent image formed on the surface of the photosensitive drum 105, thereby forming a toner image.

The secondary transfer portion 140 performs a secondary transfer, to the sheet P, of the toner image supported on the intermediate transfer member 150. The secondary transfer portion 140 is equipped with a secondary transfer roller pair 151.

The secondary transfer roller pair 151 is provided on the main conveying path 190 and nips the sheet P and the intermediate transfer member 150 which are being conveyed on the main conveying path 190. The secondary transfer roller pair 151 performs a secondary transfer, to the sheet P, by pressing the sheet P against the intermediate transfer member 150 and applying a bias with an inverse characteristic to that of the toner. The secondary transfer roller pair 151 conveys the sheet P, which has undergone a secondary transfer, to the fixing processing portion 160.

The intermediate transfer portion 152 is equipped with the intermediate transfer member 150. Toner images are subjected to a primary transfer to the intermediate transfer member 150 by the photosensitive drums 105 of the optical development processing portion 120, optical development processing portion 121, optical development processing portion 122, and optical development processing portion 123, thereby creating a full-color toner image.

The fixing processing portion 160 constituting a fixing portion applies fixing processing to the toner image transferred to the sheet P being conveyed from the secondary transfer roller pair 151, thereby fixing the image (toner image) to the sheet P, and conveys the sheet P, whereon the image has been fixed, toward the discharge portion 170. The fixing processing portion 160 is equipped with a heating roller 161 and a pressure roller 162 that nip and convey the sheet P, and a heat source such as a halogen lamp that heats the toner image on the sheet P via the heating roller 161.

The discharge portion 170 performs sorting in the conveyance direction of the sheet P whereon an image has been fixed and that is being conveyed by the fixing processing portion 160. The discharge portion 170 is equipped with a discharge roller pair 171, a reversing entrance roller 172, a first switching flap 173, and a second switching flap 174.

The discharge roller pair 171 discharges the sheet P being conveyed from the main conveying path 190 by the fixing processing portion 160 to outside the image forming apparatus 100.

The reversing entrance roller 172, which constitutes a conveying roller, conveys the sheet P, which is guided and conveyed by the first switching flap 173, toward the sheet reversing apparatus 200.

The first switching flap 173 guides the sheet P being conveyed from the main conveying path 190 by the fixing processing portion 160 to the discharge roller pair 171 or guides the sheet to the second switching flap 174 under the control of the engine controller 103*a*.

The second switching flap 174 is provided further on the upstream side in the conveyance direction of the sheet P prior to reversing conveyance, than the reversing entrance roller 172. Under the control of the engine controller 103*a*, the second switching flap 174 guides the sheet P, which has been guided and conveyed to the first switching flap 173, to the reversing entrance roller 172. Alternatively, under the control of the engine controller 103*a*, the second switching flap 174 guides the sheet P, which has been conveyed in reverse by the sheet reversing apparatus 200, to the discharge roller pair 171 when face-down discharge is to be performed. Here, face-down discharge refers to discharging the sheet with the side whereon the image is formed facing down in the case of single-sided printing.

An operation portion 180 constituting a display portion is equipped with a display device such as a liquid-crystal panel for displaying information, and an input device such as a physical key or a touch panel that allows the user to input commands or data to the image forming apparatus 100.

The sheet reversing apparatus 200 conveys the sheet P in reverse when performing duplex printing on the sheet P or when performing face-down discharge. The sheet reversing apparatus 200 is equipped with a reversing/retraction portion 210 constituting a retraction portion. Note that the details of the configuration of the sheet reversing apparatus 200 will be described subsequently.

The duplex conveying mechanism 220 merges with the feed conveying portion 110 further on the upstream side in the conveyance direction of sheet P than the secondary transfer portion 140. The duplex conveying mechanism 220 reconveys the sheet P that has been reversed by the sheet reversing apparatus 200 to the secondary transfer portion 140. The duplex conveying mechanism 220 is equipped with the duplex conveying path 202 that extends horizontally in FIG. 1.

Here, various types of sheets can be used for the sheet P used as the recording material, such as plain paper, recycled paper, glossy paper, coated paper that has been surface-treated with a resin coating or the like, thin paper, or thick paper. Further, in this embodiment, a long sheet whose length in the conveyance direction is longer than the typical standard size (for example, a sheet longer than 420 mm, the long side of an A3 sheet) can be used as the recording material.

Note that long sheets are not necessarily stored in the storage compartment 110*a* and may, for example, be placed in a manual feed tray protruding from the side of the enclosure 101, and fed one by one from the manual feed tray to the feed conveying portion 110 using a feed roller.

<Configuration of Sheet Reversing Apparatus>

The configuration of a sheet reversing apparatus 200 according to the first embodiment of the present invention will be described in detail with reference to FIGS. 1 and 2.

The sheet reversing apparatus 200 has an upstream conveying path 201, a duplex conveying path 202, a duplex conveying roller 206, a reversing/retraction portion 210, a conveyance sensor 229, a reversing roller pair 230, and a duplex switching flap 231.

The upstream conveying path 201 is the conveying path through which the sheet P, which is guided to the reversing entrance roller 172 by the first switching flap 173, passes. The upstream conveying path 201 is equipped with a conveying guide 201*a* and a conveying guide 201*b*, which constitute guide portions that guide the conveying of the sheet P.

The duplex conveying path 202 is a conveying path through which the sheet P, which is conveyed in reverse by the reversing roller pair 230, passes. The duplex conveying path 202 is provided below the main conveying path 190. The duplex conveying path 202 is connected to the merging portion that merges with the main conveying path 190 via the duplex conveying mechanism 220. The duplex conveying path 202 branches off from the upstream conveying path 201 on the upstream side of the reversing roller pair 230 in the conveyance direction of the sheet P prior to reversing conveyance. The duplex conveying path 202 is extended substantially horizontally in FIG. 1.

The duplex conveying roller 206 is provided on the duplex conveying path 202. The duplex conveying roller 206 conveys the sheet P, which is conveyed in reverse by the reversing roller pair 230 and fed into the duplex conveying path 202, toward the duplex conveying mechanism 220 via the duplex conveying path 202.

The reversing/retraction portion 210 is provided further on the downstream side in the conveyance direction of the sheet P prior to reversing conveyance, than the reversing roller pair 230. The reversing/retraction portion 210 is provided below the duplex conveying path 202. The reversing/retraction portion 210 is arranged to overlap at least partially, in a vertical direction, the fixing processing portion 160 and the discharge portion 170, which are located above the reversing/retraction portion 210. The reversing/retraction portion 210 is arranged horizontally aligned in FIG. 1 with the storage compartment 110*a* of the feed conveying portion 110.

Figure 2:
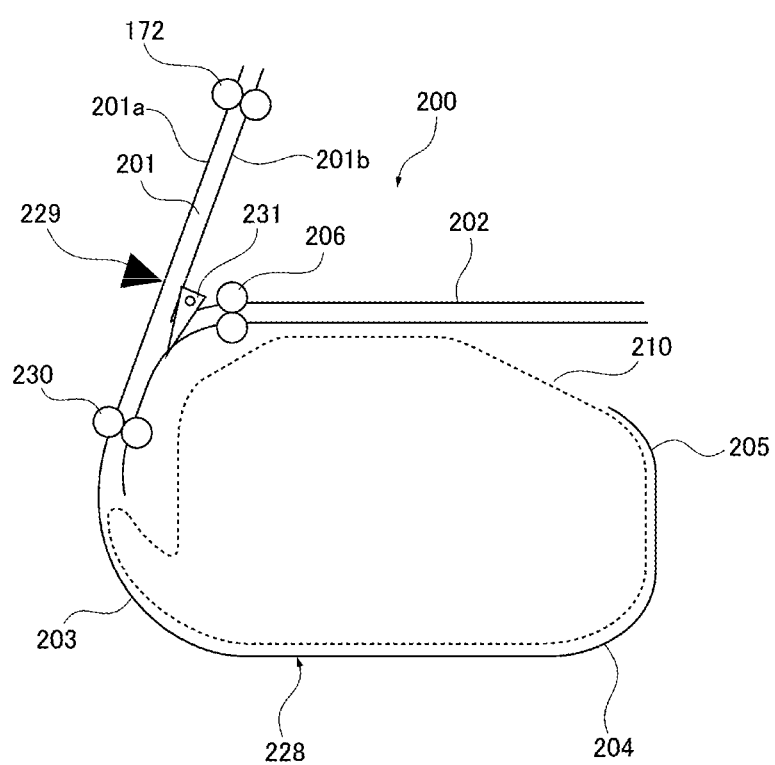
FIG. 2 is a schematic diagram of a sheet reversing apparatus according to the first embodiment of the present invention.

The reversing/retraction portion 210 has a retraction area, indicated by the dashed line in FIG. 2, for temporarily retracting a portion of the sheet P fed by the reversing roller pair 230 such as when the reversing roller pair 230 conveys the sheet P in reverse. This retraction area is a conveyance space that is configured by being surrounded by a guide member 228, which is equipped with a first bend 203, a second bend 204, and a third bend 205. The guide member 228 is a support portion that is configured to support the sheet P, which is conveyed in the forward direction by the reversing roller pair 230, in order to convey the sheet P in an opposite direction opposite to the forward direction. Here, the forward direction is the direction in which the sheet P is conveyed from the conveying roller 172 to the reversing roller pair 230.

The conveyance sensor 229, which constitutes a first detection portion, is provided further on the upstream side in the forward direction, which is the conveyance direction of the sheet P prior to reversing conveyance, than the reversing roller pair 230. The conveyance sensor 229 detects the timing at which the sheet P passes by detecting the leading edge and trailing edge of the sheet P being conveyed or conveyed in reverse, and outputs the detection results to the engine controller 103a of the control board storage portion 103. The detection results output from the conveyance sensor 229 to the engine controller 103a are used to control the conveying of the sheet P, such as when determining the timing to pause the conveying of the sheet P when conveying the sheet P in reverse.

The conveyance sensor 229 uses a reflective sensor equipped with a light-emitting portion and a light-receiving portion. In the conveyance sensor 229, the light emitted from the light-emitting portion does not return to the light-receiving portion when the sheet P is not passing through, and the light emitted from the light-emitting portion is reflected by the sheet P and enters the light-receiving portion when the sheet P is passing through. As a result, the conveyance sensor 229 can detect whether or not the sheet P is passing through by detecting the increase in the light quantity received, because the light quantity received by the light-receiving portion increases when the sheet P is passing through. The conveyance sensor 229 is provided on the upstream conveying path 201 and emits light from a light-emitting portion toward the inside of the upstream conveying path 201.

In general, a reflective sensor becomes undetectable when the reflective sensor is farther than a predetermined distance from the object to be detected, such as the sheet P, because the light reflected from the object does not reach the light-receiving portion. The distance between the conveying guide 201a and the conveying guide 201b of the upstream conveying path 201 is 2 to 3 mm. The distance between the conveyance sensor 229 and the conveying guide 201b on the opposite side is 4 mm to 5 mm. As a result, the conveyance sensor 229 is configured to reliably detect the sheet P even when the sheet P is farthest away from the conveyance sensor 229, by passing near the conveying guide 201b. Furthermore, the distance between the conveyance sensor 229 and the reversing roller pair 230 is approximately 100 mm.

The reversing roller pair 230 is provided further on the downstream side in the conveyance direction of the sheet P prior to reversing conveyance, than the point where the upstream conveying path 201 and the duplex conveying path 202 merge. The reversing roller pair 230 is connected to a motor capable of forward or reverse rotation that is drive-controlled by the engine controller 103a, and is configured to switch the conveyance direction of the sheet P when the motor is switched from forward rotational driving to reverse rotational driving or from reverse rotational driving to forward rotational driving. When an image is formed on sheet P by the image forming portion, the reversing roller pair 230 conveys the sheet P in the forward direction or the opposite direction by being controlled by the engine controller 103a based on the detection results from the conveyance sensor 229.

The duplex switching flap 231 is located where the upstream conveying path 201 and the duplex conveying path 202 merge. The duplex switching flap 231 guides the sheet P conveyed from the upstream conveying path 201 to the reversing roller pair 230 or regulates the reverse flow of the sheet P conveyed in reverse by the reversing roller pair 230 to the upstream conveying path 201 under the control of the engine controller 103a.

<Operation of Image Forming Apparatus>

The operation of the image forming apparatus 100 according to the first embodiment of the present invention will be described in detail.

First, the primary charger 111 charges the photosensitive drum 105.

Next, the laser scanner portion 107 of each of the optical development processing portion 120, optical development processing portion 121, optical development processing portion 122, and optical development processing portion 123 emits the laser beam from the semiconductor laser 108 according to image data input from the printer controller 103b.

The laser beam emitted from the semiconductor laser 108 is guided to the photosensitive drum 105 via the reflex polygon mirror 109 and exposes the photosensitive drum 105 in the main scanning direction, thereby forming an electrostatic latent image on the surface of the photosensitive drum 105.

Next, the electrostatic latent image formed on the surface of the photosensitive drum 105 is made visible as a toner image using the toner supplied by the development device 112.

Next, the toner image supported on the photosensitive drum 105 is transferred (in a primary transfer) to the intermediate transfer member 150, which is provided in the intermediate transfer portion 152, by applying a voltage, with the opposite characteristic to that of the toner image, to the intermediate transfer member 150.

During color image formation, the monochromatic toner images of yellow, magenta, cyan, and black formed in each of the optical development processing portion 120, optical development processing portion 121, optical development processing portion 122, and optical development processing portion 123 are sequentially transferred to the intermediate transfer member 150. As a result, a full-color visible image is formed on the surface of the intermediate transfer member 150.

Further, in parallel with the foregoing operation for creating a toner image, the feed conveying portion 110 conveys the sheets P one by one to the secondary transfer portion 140 while separating the sheets P from the bundle of sheets P, which are stored in the storage compartment 110a.

Next, the visible image supported on the surface of the intermediate transfer member 150 is transferred (in a secondary transfer) to the sheet P by the secondary transfer roller pair 151 of the secondary transfer portion 140.

Next, the sheet P, having passed through the secondary transfer portion 140, is conveyed to the fixing processing portion 160.

The sheet P, which has been conveyed to the fixing processing portion 160, passes through a fixing nip configured from the heating roller 161 and the pressure roller 162. Further, the toner transferred to the sheet P is heated and melted at the fixing nip, and then cooled and hardened. The image is thus fixed to the sheet P.

The sheet P, having passed through the fixing processing portion 160, is conveyed to the discharge portion 170.

The conveying path for sheet P, which has been conveyed to the discharge portion 170, is switched according to whether or not duplex printing is to be performed. In the case of single-sided printing, the sheet P is guided by the first switching flap 173 toward the discharge roller pair 171 and is discharged to outside the image forming apparatus 100 by the discharge roller pair 171.

On the other hand, in the case of duplex printing, the sheet P with the image formed on the first side is guided by the first switching flap 173 to the reversing entrance roller 172 and is conveyed to the sheet reversing apparatus 200 via the reversing entrance roller 172. The sheet reversing apparatus 200 uses the reversing/retraction portion 210 to temporarily retract the sheet P while performing reverse conveyance to convey the sheet P to the duplex conveying mechanism 220.

Next, the duplex conveying mechanism 220 reconveys the sheet P, which has had its first and second sides switched by the sheet reversing apparatus 200, to the feed conveying portion 110.

The sheet P, which has been reconveyed to the feed conveying portion 110, passes through the secondary transfer portion 140 and the fixing processing portion 160, and is thus discharged to outside the image forming apparatus 100 by the discharge roller pair 171 after an image is formed on the second side.

An image is thus formed on the sheet P by conveying the sheet P through the main conveying path 190.

<Operation of Sheet Reversing Apparatus>

The operation of the sheet reversing apparatus 200 according to the first embodiment of the present invention will be described.

First, the normal operation of the sheet reversing apparatus 200 will be described in detail with reference to FIGS. 3 to 5.

Figure 3:
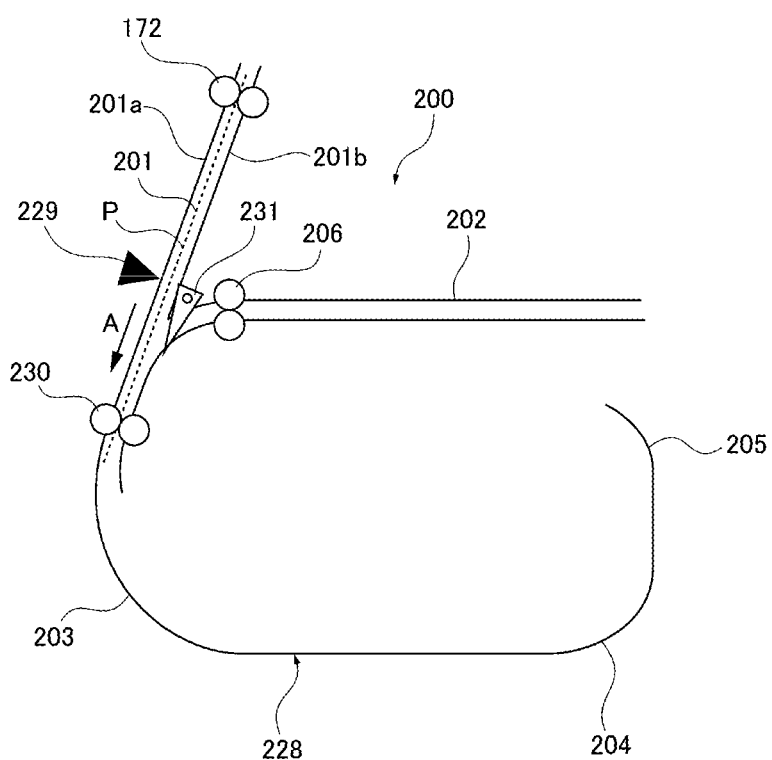
FIG. 3 is a schematic diagram illustrating operation, before reversing a sheet, of the sheet reversing apparatus according to the first embodiment of the present invention.

The sheet P, which has been conveyed from the reversing entrance roller 172 to the sheet reversing apparatus 200, is conveyed through the upstream conveying path 201 and passed to the reversing roller pair 230 (see FIG. 3).

The reversing roller pair 230 continues conveying the sheet P in the forward direction A upon receiving the sheet P from the reversing entrance roller 172. At such time, a portion of the sheet P, which is fed in the forward direction A from the reversing roller pair 230, is stored in the reversing/retraction portion 210 and is thus retracted.

The portion of the sheet P fed from the reversing roller pair 230 to the reversing/retraction portion 210 is guided while making contact with the first bend 203, the second bend 204, and the third bend 205.

Specifically, the leading edge in the conveyance direction of the sheet P, which is fed downward from the reversing roller pair 230, is guided by the first bend 203 from the upstream side in the conveyance direction of the sheet P in the duplex conveying path 202 to the downstream side (to the right in FIG. 3). Next, the tip of the sheet P is guided upward by the second bend 204.

Thus, when a long sheet P is conveyed in the forward direction by the reversing roller pair 230, the sheet P is retracted in a curved state along the first bend 203, the second bend 204, and the third bend 205 in the reversing/retraction portion 210.

The reversing roller pair 230 pauses when the rear end of the sheet P in the forward direction A passes through the duplex switching flap 231.

Figure 4:
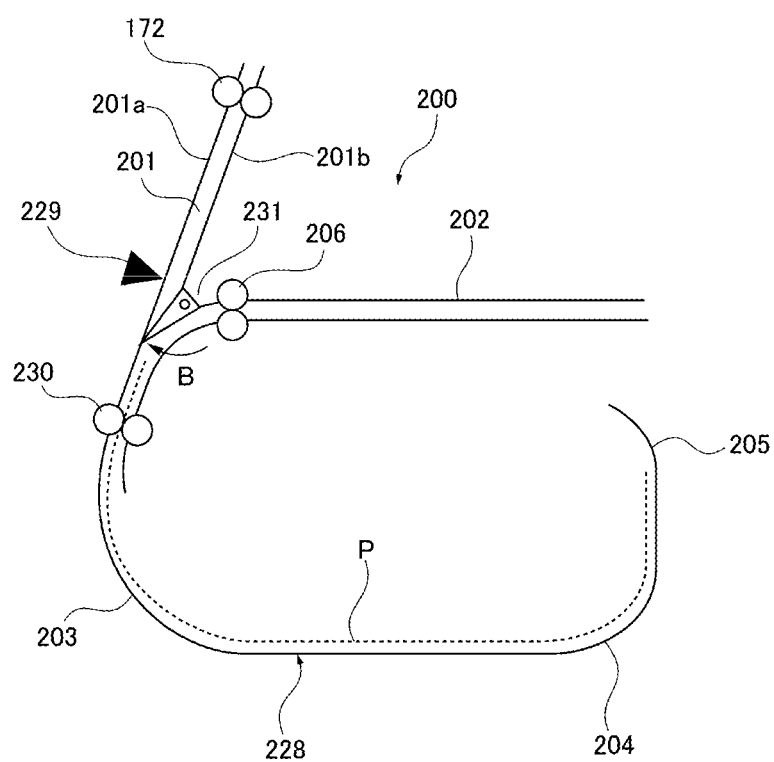
FIG. 4 is a schematic diagram illustrating operation, when reversing a sheet, of the sheet reversing apparatus according to the first embodiment of the present invention.
Figure 5:
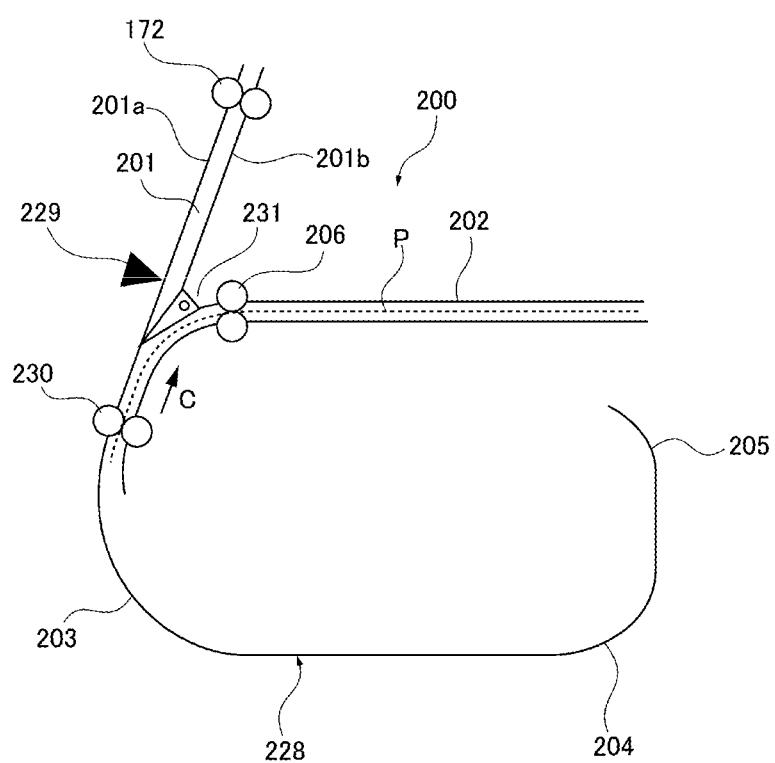
FIG. 5 is a schematic diagram illustrating operation, after reversing a sheet, of the sheet reversing apparatus according to the first embodiment of the present invention.

Next, the duplex switching flap 231 rotates in the direction of arrow B in FIG. 4 under the control of the engine controller 103a, and switches its direction to regulate the reverse flow of the sheet P into the upstream conveying path 201 and guide the sheet P into the duplex conveying path 202 (see FIG. 4).

Next, the reversing roller pair 230 is driven in reverse to switch the conveyance direction of the sheet P from the forward direction A to the opposite direction C, thereby conveying the sheet P in reverse. The sheet P is thus conveyed into the duplex conveying path 202 and conveyed by the duplex conveying roller 206 (see FIG. 5).

Note that, although the operation of the sheet reversing apparatus 200 upon conveying the reversed sheet P via the duplex conveying path 202 is described above, the present invention is not limited thereto, rather, the sheet reversing apparatus 200 can also be used when performing face-down discharge. When face-down discharge is to be performed, the sheet P, which has been conveyed in reverse by the sheet reversing apparatus 200, is guided by the second switching flap 174 to the discharge roller pair 171.

Next, the operation of the sheet reversing apparatus 200 in the event of an abnormality will be described in detail with reference to FIGS. 6 to 10.

In the event of an abnormality of the image forming apparatus 100, the reversing/retraction portion 210 functions as a storage portion for the sheet P.

The image forming apparatus 100 stops part of its operation upon detecting some kind of abnormality (for example, a sheet jam of sheet P, or irregular operation) during the image forming operation. At such time, a sheet P, which remains in a conveying path between the fixing processing portion 160 and the reversing roller pair 230, and which is not affected by the aforementioned abnormality and can be conveyed to the reversing/retraction portion 210, is conveyed toward the reversing/retraction portion 210. In this case, unlike the normal case, even when the sheet P reaches the reversing/retraction portion 210, the reversing roller pair 230 is not rotated in reverse, and the sheet P continues to be fed in the forward direction A. For example, when the sheet P has become jammed in the fixing processing portion 160, the sheet P, which remains in a conveying path between the fixing processing portion 160 and the sheet reversing apparatus 200, is conveyed toward the reversing roller pair 230 and the guide member 228.

For example, when a sheet jam occurs in the fixing processing portion 160, all sheets P remaining in the discharge portion 170 are conveyed toward the reversing/retraction portion 210. Furthermore, when a sheet jam occurs involving a plurality of sheets P that are being conveyed in the discharge portion 170, the sheets P which remain further downstream in the conveyance direction of the sheets P than the sheet P causing the sheet jam are conveyed toward the reversing/retraction portion 210.

Figure 6:
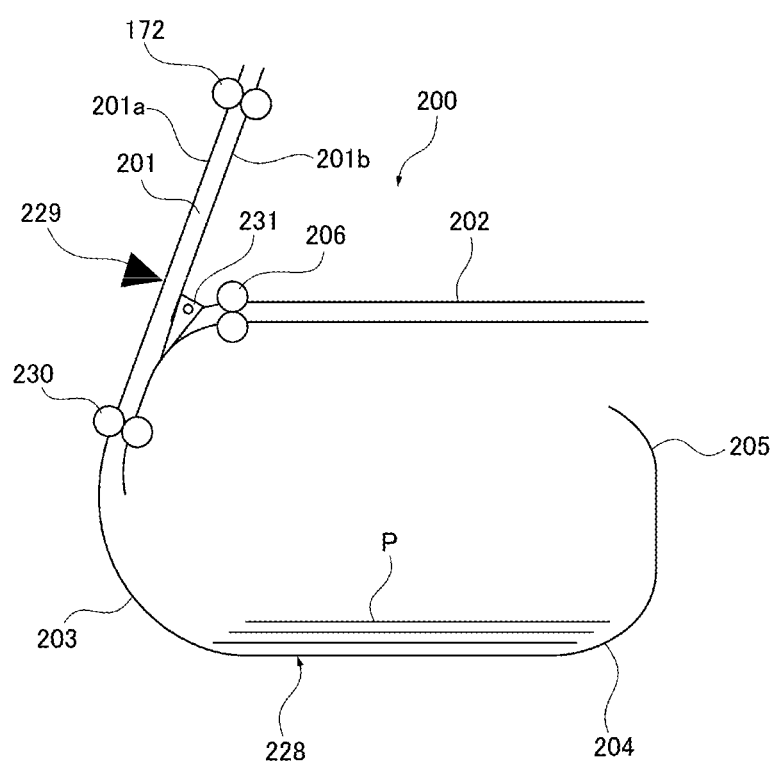
FIG. 6 is a schematic diagram illustrating a state of a reversing/retraction portion at the time of a conveyance abnormality of the sheet reversing apparatus according to the first embodiment of the present invention.

The sheet P being conveyed toward the reversing/retraction portion 210 is then discharged from the reversing roller pair 230 to the reversing/retraction portion 210 and collected in the reversing/retraction portion 210, as illustrated in FIG. 6. Because the sheets P that would have been left behind in a plurality of in-device locations of the image forming apparatus 100 are collected in one place, the work of the user to remove the in-device sheets P of the image forming apparatus 100 after an abnormal state can be simplified.

Further, the reversing roller pair 230 stops conveying and nips the sheet P which reaches the reversing roller pair 230 last (hereinafter referred to as the "final sheet") among the sheets that have collected in the reversing/retraction portion 210, without discharging the sheet to the reversing/retraction portion 210. Here, the final sheet P is the sheet P that remains the farthest upstream, among the sheets P remaining downstream in the conveyance direction of the sheets P, from the sheet P for which an abnormality such as the aforementioned sheet jam was detected.

Figure 7:
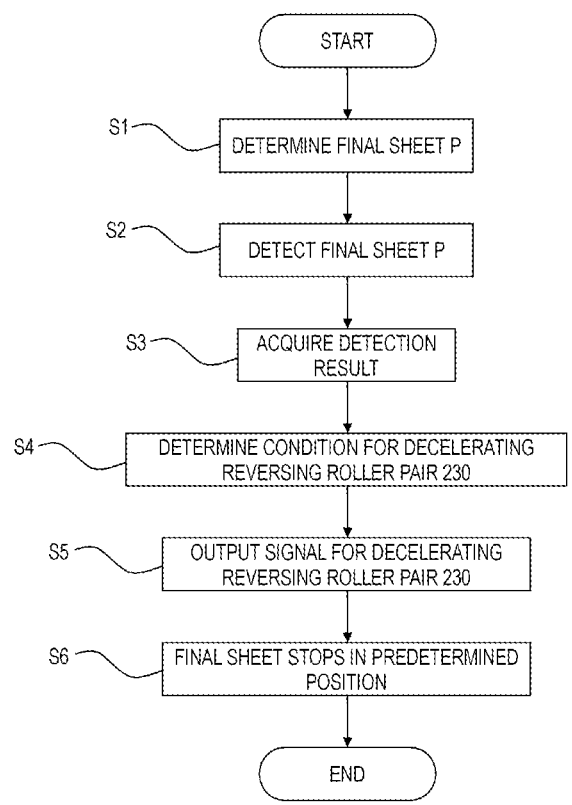
FIG. 7 is a flow diagram illustrating the operation of the sheet reversing apparatus according to the first embodiment of the present invention.

Specifically, per FIG. 7, the engine controller 103a determines the final sheet P (S1). For example, the engine controller 103a counts the number of sheets P detected by a sensor provided upstream in the conveyance direction of the sheet reversing apparatus 200. When the count value matches the number of sheets P whereon the image input by the operation portion 180 is to be formed, the engine controller 103a then determines that the sheet P with the matching count value is the final sheet P.

Next, the conveyance sensor 229 detects that the final sheet P has arrived (S2).

Next, the engine controller 103a acquires the detection results detected in the operation of step S2 (S3).

Next, the engine controller 103a determines a deceleration condition for the timing to decelerate the reversing roller pair 230 and the acceleration at the time of deceleration, based on the acquired detection results and a predetermined calculation formula (S4).

Next, the engine controller 103a outputs a signal for decelerating the reversing roller pair 230 according to the determined deceleration condition, to the motor that operates the reversing roller pair 230 (S5), and decelerates the reversing roller pair 230.

Next, the engine controller 103a stops the final sheet P in a predetermined position (S6), subsequently terminating the operation.

Figure 8:
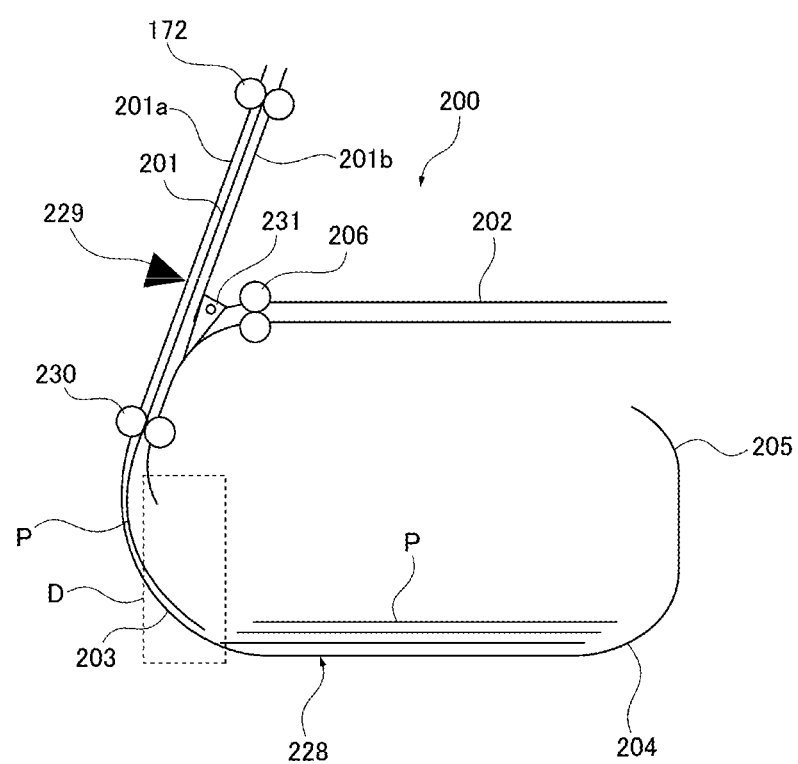
FIG. 8 is a schematic diagram illustrating the operation at the time of a conveyance abnormality of the sheet reversing apparatus according to the first embodiment of the present invention.

The predetermined position where the final sheet P stops is, for example, the position where the conveyance sensor 229 can detect the final sheet P, as illustrated in FIG. 8. Specifically, the predetermined position where the final sheet P stops is the position where the trailing edge of the final sheet P in the forward direction A is about 10 to 30 mm upstream in the forward direction A from the conveyance sensor 229.

The foregoing predetermined position is a position in which the final sheet P can be reliably detected by the conveyance sensor 229 even when the sheet P is conveyed further downstream in the forward direction A than expected. An example of a sheet P being conveyed further downstream in the forward direction A than expected is when the sheet P is conveyed further downstream in the forward direction A than expected due to the diameter of the reversing roller pair 230 being larger than nominal or due to a delay in the transmission of signals for controlling the operation of the reversing roller pair 230.

The display device of the operation portion 180 provides a display prompting the user to perform an operation to remove the sheet P, such as information indicating that the sheet P still remains, when the sheet P is detected by the conveyance sensor 229 after the sheet P has been nipped by the reversing roller pair 230 in the foregoing operation. Thus, the user is able to smoothly perform the operation to remove the sheet P by checking the display on the display device, and to check whether or not the sheet P remains in the image forming apparatus 100 after jam processing, for example.

Here, when all sheets P are stored in the reversing/retraction portion 210 during an abnormality of the sheet reversing apparatus 200, it is not possible to detect whether or not the sheets P stored in the reversing/retraction portion 210 have been removed by the user. Therefore, even if, for example, the display provides a prompt to remove a sheet P stored in the reversing/retraction portion 210, the operation of the image forming apparatus can be started in a case where the user does not notice the sheet P remaining in the reversing/retraction portion 210.

If an image forming operation is performed with the sheet P remaining in the reversing/retraction portion 210, the sheet P in the image forming operation will be damaged through contact with the sheet P remaining in the reversing/retraction portion 210 when conveyed to the reversing/retraction portion 210. Thus, the quality of the output of the image forming apparatus is reduced, or the sheet P being conveyed jams due to resistance during contact.

Figure 9:
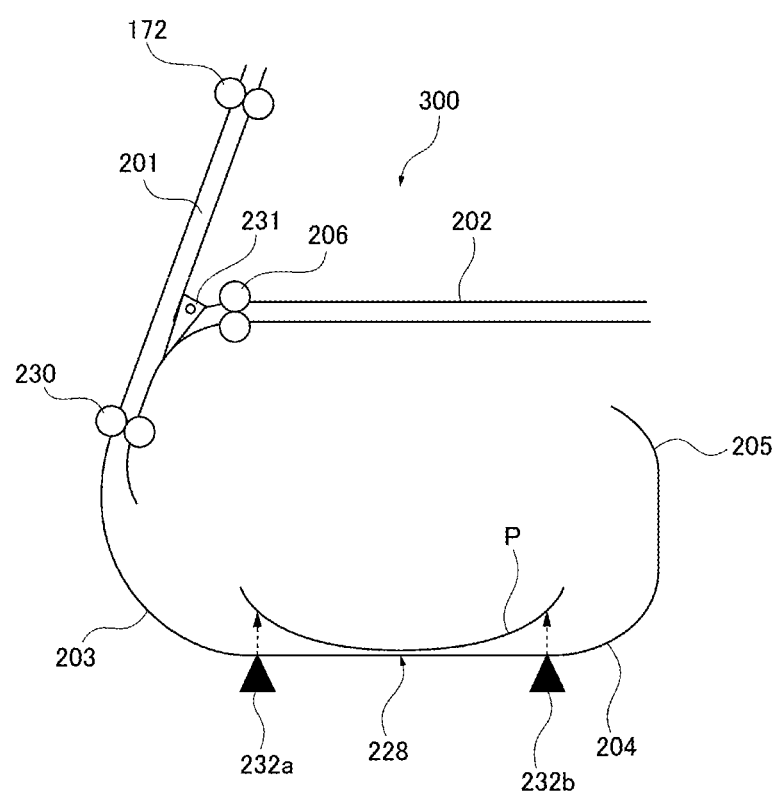
FIG. 9 is a schematic diagram illustrating a state where a retracted sheet cannot be detected in an apparatus with a different configuration from that of the sheet reversing apparatus according to the first embodiment of the present invention.

To avoid this phenomenon, the installation, as per the sheet reversing apparatus 300 illustrated in FIG. 9, of detection sensors 232a and 232b for detecting the sheet P stored in the reversing/retraction portion 210 may be considered. However, as illustrated in FIG. 9, when the sheet P has curled, the detection sensors 232a and 232b cannot detect the sheet P because the distance from the light-receiving portion to the sheet P is long, and hence the emitted light does not enter the light-receiving portion.

Figure 10:
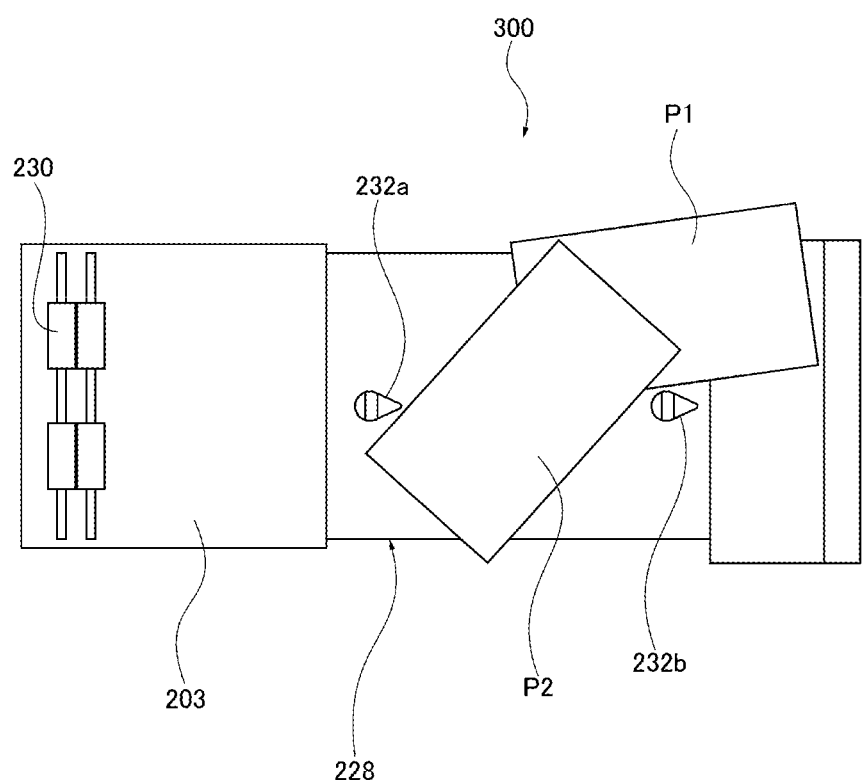
FIG. 10 is a schematic diagram illustrating another state where a retracted sheet cannot be detected in an apparatus with a different configuration from that of the sheet reversing apparatus according to the first embodiment of the present invention.

A sheet P2 that has been discharged into the reversing/retraction portion 210 may also collide with a sheet P1 which was discharged beforehand. In this case, as illustrated in FIG. 10, when sheet P1 is pushed to the back (the right side in FIG. 10) or when sheet P2 moves diagonally as viewed from above, sheets P1 and P2 cannot be detected by the detection sensors 232a and 232b.

In contrast, in this embodiment, the conveyance sensor 229 is provided on the upstream conveying path 201. Furthermore, the sheet P, which is being conveyed through the upstream conveying path 201, can maintain a distance that can be detected by the conveyance sensor 229 because its position is regulated by the conveying guides 201a and 201b. As a result, the image forming apparatus 100 can reliably detect the final sheet P by using the conveyance sensor 229, and can therefore reliably recognize that the sheet P remains in the image forming apparatus 100.

Furthermore, because the final sheet P is nipped by the reversing roller pair 230, the sheet P can continue to be detected by the conveyance sensor 229 until the sheet P is removed by the user, without the sheet P being inadvertently moved by some kind of user operation.

Furthermore, by preventing the operation of the image forming apparatus 100 from returning when the final sheet P is detected by the conveyance sensor 229, it is possible to prevent the user from forgetting to remove the sheet P.

Further, the final sheet P nipped by the reversing roller pair 230 is removed from the D portion illustrated in FIG. 8, and at such time, the user simultaneously recognizes the sheet P remaining in the reversing/retraction portion 210. The user can thus be prevented from forgetting to remove sheets P that have been collected in the reversing/retraction portion 210.

According to this embodiment, when an abnormality occurs during the conveying of a sheet P, the reversing roller pair 230 conveys the sheet P in the forward direction and also stops conveying the final sheet P among the sheets P to be conveyed in the forward direction, and nips the final sheet P. Further, when a conveyance abnormality occurs, the reversing/retraction portion 210 stores the sheet P that is being conveyed in the forward direction by the reversing roller pair 230. Furthermore, the conveyance sensor 229 detects the final sheet P that has been nipped by the reversing roller pair 230. The user can thus be prevented from forgetting to remove a stored sheet P.

Also, according to this embodiment, by arranging the reversing/retraction portion 210 and the storage compartment 110a horizontally side by side, it is possible to suppress enlargement of the image forming apparatus 100.

Second Embodiment

The configuration of the image forming apparatus according to the second embodiment of the present invention is the same as in FIG. 1, and hence a description thereof is omitted. Moreover, because the operation of the image forming apparatus according to this embodiment is the same as the operation of the image forming apparatus 100 according to the first embodiment above, the description thereof is omitted.

<Configuration of Sheet Reversing Apparatus>

The configuration of a sheet reversing apparatus 1200 according to a second embodiment of the present invention will be described in detail with reference to FIG. 11.

Figure 11:
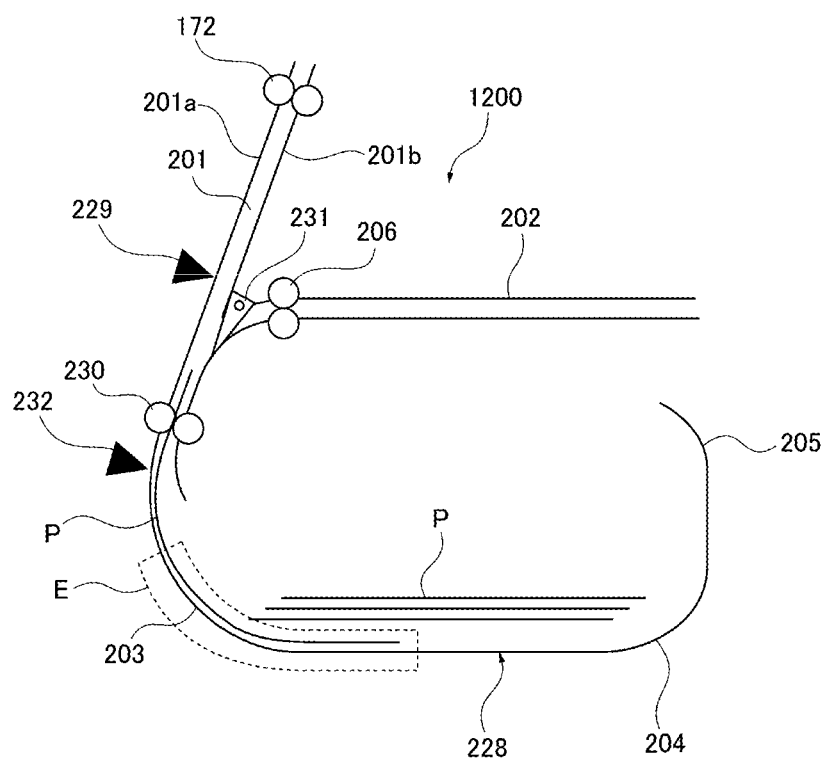
FIG. 11 is a schematic diagram illustrating the configuration of a sheet reversing apparatus according to a second embodiment of the present invention.

Note that, in FIG. 11, the same reference signs are assigned to parts with the same configuration as in FIG. 2, and a detailed description thereof is omitted.

The sheet reversing apparatus 1200 has an upstream conveying path 201, a duplex conveying path 202, a duplex conveying roller 206, a reversing/retraction portion 210, a conveyance sensor 229, a reversing roller pair 230, a duplex switching flap 231, and a detection sensor 232.

The detection sensor 232, which constitutes a second detection portion, is disposed downstream in the forward direction A of the reversing roller pair 230, and detects the sheet P being conveyed by the reversing roller pair 230.

In the sheet reversing apparatus 1200 having the above configuration, the engine controller 103a controls the reversing roller pair 230 so that the sheet P is conveyed in the forward direction by the reversing roller pair 230 when an abnormality arises. The engine controller 103a then controls the reversing roller pair 230 to continue conveying the sheets P until the final sheet of the sheets P conveyed in the forward direction is detected by the detection sensor 232, and subsequently to stop in a state where the final sheet is nipped by the reversing roller pair 230. The sheet P can thus be stopped closer to the reversing/retraction portion 210, and hence the portion of the sheet P protruding into the reversing/retraction portion 210 (portion E in FIG. 11) can be made larger than in the foregoing first embodiment, and the user can easily recognize the sheet P which has been nipped by the reversing roller pair 230.

It is understood that the invention is not limited to or by the foregoing embodiments, and may be modified in various ways without departing from the spirit thereof.

Specifically, although the present invention was applied, in the foregoing first and second embodiments, to an image forming apparatus that is equipped with a tandem-type, intermediate-transfer electrophotographic mechanism, the invention is not limited thereto. For example, the present invention may also be applied to an image forming apparatus equipped with an electrophotographic mechanism of the direct transfer type, in which toner images formed on photosensitive bodies are transferred to a sheet without passing via an intermediate transfer member. The present invention is not limited to electrophotographic mechanisms, and may also be applied to an image forming apparatus equipped with an inkjet printing unit or an offset printing mechanism.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2021-055088, filed Mar. 29, 2021, which is hereby incorporated by reference herein in its entirety.

What is claimed is:

1. A sheet reversing apparatus comprising:
   a reversing roller pair configured to convey, after conveying a sheet in a forward direction while the sheet is in a nipped state, the sheet in reverse by conveying the sheet in an opposite direction opposite to the forward direction;
   a support portion configured to support the sheet conveyed in the forward direction by the reversing roller pair, in order to convey the sheet in the opposite direction;
   a first detection portion configured to detect the sheet that is conveyed by the reversing roller pair; and
   a control portion configured to control conveying of the sheet by the reversing roller pair based on a detection result from the first detection portion,
   wherein, in a state where a sheet jam of a jammed sheet occurs during the conveying of the sheet, the control portion is configured to:
      control the reversing roller pair to discharge a plurality of sheets, except a final sheet among the plurality of sheets, that remain further downstream in the conveyance direction than the jammed sheet, to the support portion; and then
      stop the reversing roller pair in a state where the final sheet is nipped by the reversing roller pair and detected by the first detection portion.

2. The sheet reversing apparatus according to claim 1, further comprising:
   a conveying roller pair provided upstream in the forward direction of the reversing roller pair, and configured to convey the sheet toward the reversing roller pair,
   wherein the forward direction is the direction in which the sheet is conveyed from the conveying roller to the reversing roller pair.

3. The sheet reversing apparatus according to claim 1, wherein the first:
   detection portion is provided at an upstream side in the forward direction of the reversing roller pair.

4. The sheet reversing apparatus according to claim 1, wherein the support portion includes a bend portion.

5. The sheet reversing apparatus according to claim 1, wherein:
   the support portion includes a first bend portion and a second bend portion, and
   in a state where the reversing roller pair conveys a long sheet, where a length thereof in the conveyance direction is longer than a conventional standard size, in the forward direction, the long sheet becomes retracted in a curved state along the first bend portion and the second bend portion.

6. An image forming apparatus comprising:
   an image forming portion configured to form an image on a sheet; and
   a sheet reversing apparatus configured to convey in reverse the sheet on which the image has been formed by the image forming portion, and comprising:
      a reversing roller pair configured to convey, after conveying the sheet in a forward direction while the sheet is in a nipped state, the sheet in reverse by conveying the sheet in an opposite direction opposite to the forward direction;
      a support portion configured to support the sheet conveyed in the forward direction by the reversing roller pair, in order to convey the sheet in the opposite direction;
      a first detection portion configured to detect the sheet that is conveyed by the reversing roller pair; and
      a control portion configured to control conveying of the sheet by the reversing roller pair based on a detection result from the first detection portion, wherein, in a state where a sheet jam of a jammed sheet occurs during the conveying of the sheet, the control portion is configured to:

control the reversing roller pair to discharge a plurality of sheets, except a final sheet among the plurality of sheets, that remain further downstream in the conveyance direction than the jammed sheet, to the support portion; and then stop the reversing roller pair in a state where the final sheet is nipped by the reversing roller pair and detected by the first detection portion.

7. The image forming apparatus according to claim 6, further comprising a display portion configured to display, in the state where the sheet jam occurs, information indicating that the jammed sheet has been detected by the first detection portion and that the jammed sheet remains.

8. The image forming apparatus according to claim 6, wherein, in a state where an image is to be formed on a sheet by the image forming portion, the reversing roller pair is configured to convey the sheet on which the image is to be formed in the forward direction or the opposite direction based on the detection result from the first detection portion.

9. The image forming apparatus according to claim 6, wherein:

the image forming portion includes a fixing portion configured to fix a toner image that has been transferred to the sheet on which the image is to be formed, the sheet jam is where the jammed sheet has become jammed in the fixing portion, and in the state where the sheet jam occurs, the image forming portion is configured to convey the jammed sheet, which remains in a conveying path between the fixing portion and the sheet reversing apparatus, toward the reversing roller pair and the support portion.

10. The image forming apparatus according to claim 9, wherein the final sheet remains the farthest upstream among the plurality of sheets remaining downstream in the conveyance direction of the jammed sheet.

* * * * *